United States Patent
Lai

(10) Patent No.: US 11,979,689 B2
(45) Date of Patent: May 7, 2024

(54) PROJECTION SYSTEM AND PROJECTED IMAGE STACKING METHOD

(71) Applicant: Coretronic Corporation, Hsin-Chu (TW)

(72) Inventor: Hsin-Ya Lai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/728,974

(22) Filed: Apr. 25, 2022

(65) Prior Publication Data

US 2022/0345672 A1 Oct. 27, 2022

(30) Foreign Application Priority Data

Apr. 27, 2021 (CN) .......................... 202110457313.X

(51) Int. Cl.
*H04N 9/31* (2006.01)
(52) U.S. Cl.
CPC ........... *H04N 9/3147* (2013.01); *H04N 9/317* (2013.01); *H04N 9/3185* (2013.01)
(58) Field of Classification Search
CPC .... G03B 21/006; G03B 21/008; G03B 21/28; G03B 21/56; G03B 21/142; G03B 21/147; G03B 21/2013; G03B 21/2033; H04N 9/315; H04N 9/317; H04N 9/3141; H04N 9/3147; H04N 9/3185; H04N 9/3194
See application file for complete search history.

(56) References Cited

U.S. PATENT DOCUMENTS

| | | | | |
|---|---|---|---|---|
| 7,954,957 B2 * | 6/2011 | Izumida | ............... | H04N 9/3194 353/70 |
| 8,152,312 B2 * | 4/2012 | Kondo | ................ | H04N 9/3147 345/1.3 |
| 10,663,844 B2 * | 5/2020 | Urano | .................. | H04N 9/3182 |
| 11,258,996 B2 * | 2/2022 | Kashiwagi | ........... | H04N 9/3185 |

(Continued)

FOREIGN PATENT DOCUMENTS

| | | |
|---|---|---|
| CN | 1543207 | 11/2004 |
| CN | 1735173 | 2/2006 |

(Continued)

OTHER PUBLICATIONS

"Office Action of China Counterpart Application", issued on Nov. 15, 2023, p. 1-p. 15.

*Primary Examiner* — Sultan Chowdhury
(74) *Attorney, Agent, or Firm* — JCIPRNET

(57) ABSTRACT

A projection system and a projected image stacking method are provided, in the method, an individual representative position of each captured image is identified, wherein the captured images are obtained by respectively capturing an area projected by multiple projectors, and each individual representative position is related to image content projected by each projector. A common representative position is set in the area. A projection lens of each projector is shifted according to a distance difference between each individual representative position and the common representative position. In this way, the projection lens is quickly shifted, and is further applied to stacking operations. The operation of multiple projectors is as convenient as the operation of a single projector based on control of a remoter or keys of a projector control interface.

23 Claims, 13 Drawing Sheets

(56) References Cited

U.S. PATENT DOCUMENTS

| | | | |
|---|---|---|---|
| 2004/0227908 A1 | 11/2004 | Wada et al. | |
| 2006/0187299 A1 | 8/2006 | Miyazawa | |
| 2009/0141255 A1 | 6/2009 | Yoshizawa | |
| 2011/0292080 A1 | 12/2011 | Oka | |
| 2014/0104582 A1 | 4/2014 | Mori | |
| 2014/0111536 A1 | 4/2014 | Shinozaki | |
| 2019/0149783 A1* | 5/2019 | Kotani | G03B 21/2053 353/94 |
| 2021/0302810 A1* | 9/2021 | Kinoshita | G03B 21/2013 |

FOREIGN PATENT DOCUMENTS

| | | |
|---|---|---|
| CN | 101180873 | 5/2008 |
| CN | 103428509 | 12/2013 |
| CN | 103517017 | 1/2014 |
| CN | 104811637 | 7/2015 |
| CN | 104793450 | 2/2017 |
| CN | 106773478 | 5/2017 |
| CN | 108828879 | 11/2018 |
| CN | 111131800 | 5/2020 |
| CN | 111225195 | 6/2020 |
| JP | 2005004201 | 1/2005 |
| JP | 2006215426 | 8/2006 |
| JP | 2013145949 | 7/2013 |
| JP | 2014107713 | 6/2014 |
| JP | 2017055346 | 3/2017 |
| JP | 2019207392 | 12/2019 |
| JP | 2020194998 | 12/2020 |
| WO | 2014050415 | 4/2014 |

\* cited by examiner

PROJECTION SYSTEM AND PROJECTED IMAGE STACKING METHOD

CROSS-REFERENCE TO RELATED APPLICATION

This application claims the priority benefit of China application serial no. 202110457313.X, filed on Apr. 27, 2021. The entirety of the above-mentioned patent application is hereby incorporated by reference herein and made a part of this specification.

BACKGROUND

Technical Field

The disclosure relates to a projection technique, and particularly relates to a projection system and a projected image stacking method.

Description of Related Art

It is a known practice in the industry to perform full image stacking on images projected by multiple projectors to increase the brightness of the images. However, when the images of the projectors are overlapped and adjusted, the prior art usually first calibrates in a manual approach to perform a rough adjustment on projection lens shifting before projecting a test pattern, and then automatically corrects image distortion through calculation. The method of manually adjusting the projection lens shifting requires a long calibration time when multiple projectors are set, and the judgment using the human eye lacks accuracy. Moreover, if a projection lens has a position shift during the user uses the projector, quick re-calibration cannot be conveniently performed, which is quite inconvenient for the user or causes a problem that the image cannot be used effectively. (It means the images projected by multiple projectors can overlapped effectively.) For example, a multi-projector system includes multiple projectors and one or more cameras. Taking image overlap of four projectors as an example, a brightness of a projected image of the four projectors may be increased through stacking. When the projectors need to be stacked, heights and angles of the projectors are required to be adjusted manually first, or the images are roughly stacked together through projection lens shifting. Then, each projector may project a test pattern by using automatic splicing software, and then the images projected by multiple projectors are warped through the calculation to finally achieve a maximum image stacking effect.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure is directed to a projection system and a projected image stacking method, which are adapted to automatically shift a projection lens to quickly obtain the maximum image stacking, thereby saving time and improving accuracy.

Other objects and advantages of the disclosure may be further illustrated by the technical features broadly embodied and described as follows.

In order to achieve one or a portion of or all of the objects or other objects, an embodiment of the disclosure provides a projected image stacking method including the following steps. An individual representative position of each of captured images is identified, where the captured images are obtained by respectively capturing an area projected by multiple projectors, and each individual representative position is related to image content projected by each of the projectors. A common representative position is set in the area. A projection lens of each of the plurality of projectors is shifted according to a distance difference between each individual representative position and the common representative position.

In order to achieve one or a portion of or all of the objects or other objects, an embodiment of the disclosure provides a projection system including (but not limited to) multiple projectors, an image capturing device, and a processor. The projectors are configured to project multiple images. The image capturing device is configured to capture multiple captured images of an area projected by the projectors. The processor is configured to identify an individual representative position of each of the captured images, set a common representative position in the area, and shift a projection lens of each of the plurality of projectors according to a distance difference between each individual representative position and the common representative position. The captured images are obtained by the image capturing device by respectively capturing the area projected by the projectors, and each individual representative position is related to image content projected by each of the projectors.

Based on the above description, according to the projection system and the projected image stacking method of the embodiments of the disclosure, the each individual representative position and the common common representative position are determined through image recognition of the images projected by the projectors, and each projection lens is shifted accordingly to make each individual representative position in the projected image to overlap with or are close to the common representative position. Thus, images may be stacked quickly and automatically to eliminate man-made defects. For example, a user may control a remote controller or keys of a control interface of a projector to make the operation of multiple projectors as convenient as the operation of a single projector, and make the projectors to have the advantages of low-cost and flexible arbitrary combination.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "left," "right," "front," "back," etc., is used with reference to the orientation of the Figure(s) being described and are not intended to be limiting of the disclosure. Moreover, the term "couple" mentioned in the following embodiments may refer to any direct or indirect connection. In addition, the term "signal" may refer to at least one current, voltage, charge, temperature, data, electromagnetic wave, or any other one or more signals.

Figure 1A:
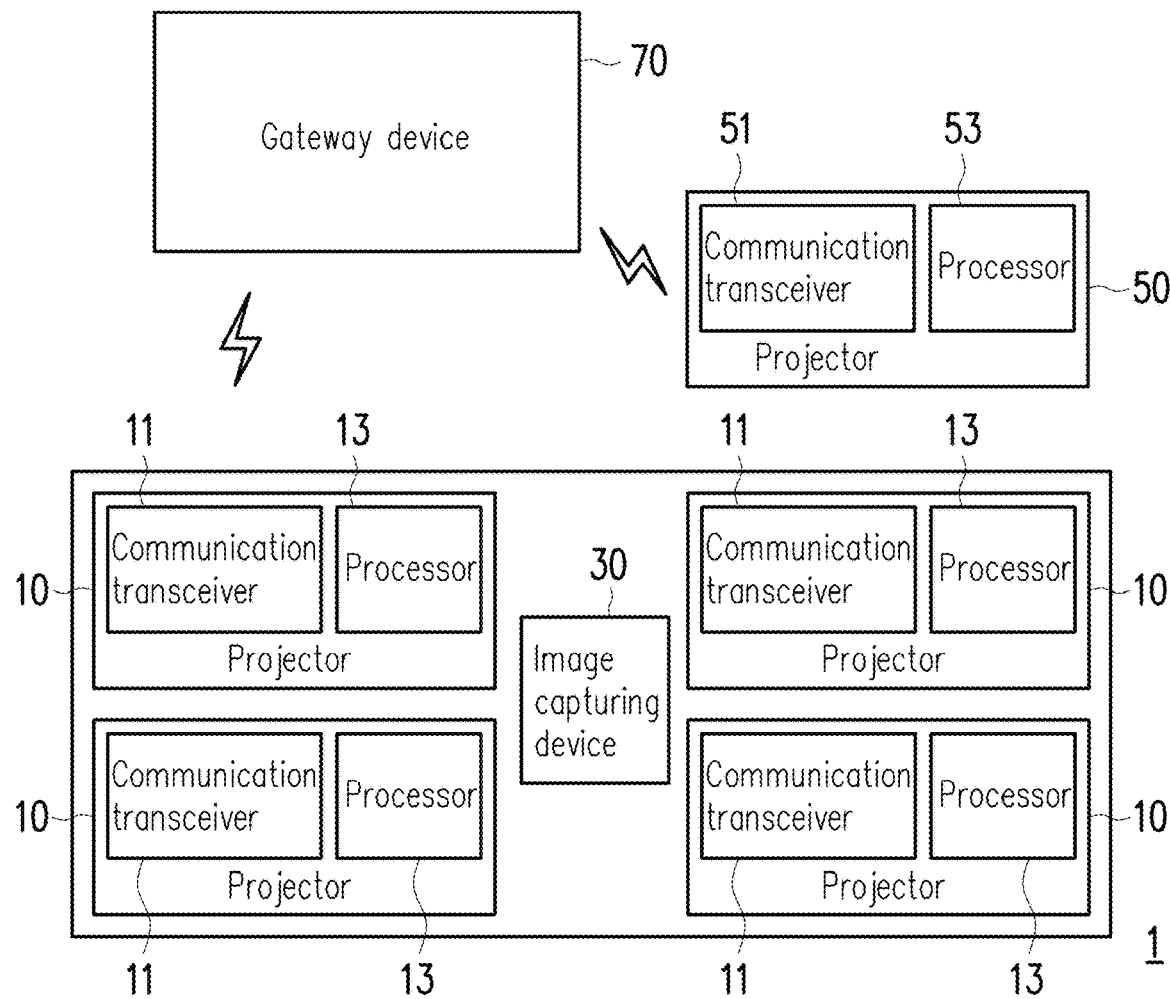
FIG. 1A is a schematic diagram of a projection system according to an embodiment of the disclosure.

FIG. 1A is a schematic diagram of a projection system 1 according to an embodiment of the disclosure. Referring to FIG. 1A, the projection system 1 includes (but is not limited to) multiple projectors 10, an image capturing device 30, a computing device 50, and a gateway device 70.

The projector 10 may be a video playback device of digital light processing (DLP), liquid crystal display (LCD), light emitting diode (LED), or other projection display technologies. The projector 10 includes (but is not limited to) a communication transceiver 11 and a processor 13.

The communication transceiver 11 may be a wireless transceiver that supports Wi-Fi, Bluetooth, infrared, fourth-generation (4G) or later generation mobile communication, and other wireless communication techniques, or may be a wired transceiver that supports USB, Ethernet, or other wired communication techniques.

The processor 13 is coupled to the communication transceiver 11 and may be a central processing unit (CPU), a microcontroller, a chip programmable controller, an application-specific integrated circuit (ASIC), or a field programmable gate array (FPGA), or other similar components or a combination of the above components.

It should be noted that the projector 10 also includes a light source, a projection lens, a motor, and other components (not shown), where the projection lens is composed of multiple lenses.

The image capturing device 30 may be a monochrome camera, a color camera, a depth camera, a video camera, or other image sensing devices capable of capturing images.

Figure 1B:
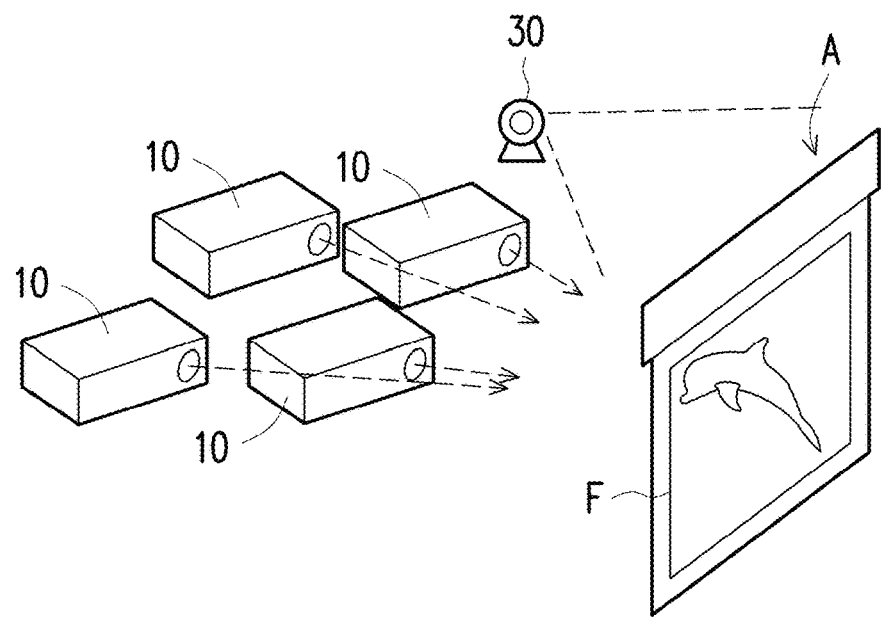
FIG. 1B is a schematic diagram of projection stacking according to an embodiment of the disclosure.

FIG. 1B is a schematic diagram of projection stacking according to an embodiment of the disclosure. Referring to FIG. 1B, in an embodiment, the image capturing device 30 is used to capture an area A projected by the multiple projectors 10 to obtain one or more captured images. If a projected image F projected by the projectors 10 is located on the area A, the image capturing device 30 may capture the projected image F of the projectors 10.

The computing device 50 may be a desktop computer, a notebook computer, an all-in-one (AIO) computer, a smartphone, a tablet computer, or a server. The computing device 50 includes (but is not limited to) a communication transceiver 51 and a processor 53.

The communication transceiver 51 is coupled to the processor 53. The implementation of the communication transceiver 51 may refer to the communication transceiver 11, and the detail thereof is not repeated. The implementation of the processor 53 may refer to the processor 13, and the detail thereof is not repeated.

The gateway device 70 may be a router, a gateway, or a switch. In an embodiment, the gateway device 70 is used to connect the computing device 50, the image capturing device 30, and/or the projectors 10, so that these devices can transmit data to each other. In an embodiment, the computing device 50, the image capturing device 30, and/or the projectors 10 may be directly connected to each other in a wired or wireless manner. In an embodiment, a part or all of the computing device 50, the image capturing device 30, and/or the projectors 10 may be integrated into one device.

In order to facilitate understanding of an operation process of the embodiment of the disclosure, some embodiments are provided below to describe the operation process of the projection system 1 of the embodiment of the disclosure in detail. In the following description, the method of the embodiment of the disclosure is described with reference of various devices and components in the projection system 1. The process of the method may be adjusted according to an actual implementation situation, which is not limited by the disclosure.

Figure 2:
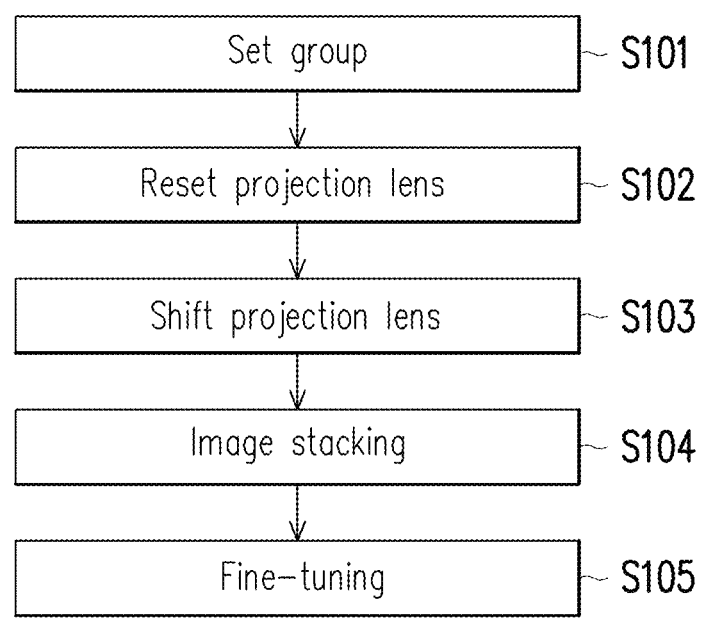
FIG. 2 is a flowchart of an common projection stacking procedure according to an embodiment of the disclosure.

FIG. 2 is a flowchart of an common projection stacking procedure according to an embodiment of the disclosure. Referring to FIG. 2, the processor 53 of the computing device 50 may set one or more groups for the multiple projectors 10 (step S101). In an embodiment, the projectors 10 may form one or more local area networks (LAN) through the gateway device 70. A group may be formed by multiple projectors 10 in the same LAN, and the group is used to realize a common operation of subsequent operations. In other embodiments, one of the projectors 10 may be used as a master projector 10, and other slave projectors 10 are controlled by the processor 13 of the master projector 10. Namely, the processor 13 of the main projector has the same function as the processor 53 of the computing device 50, and the processor 53 of the computing device 50 is taken as an example for description. In other embodiments, the processor 13 of the main projector 10 may be used for implementation.

Figure 3:
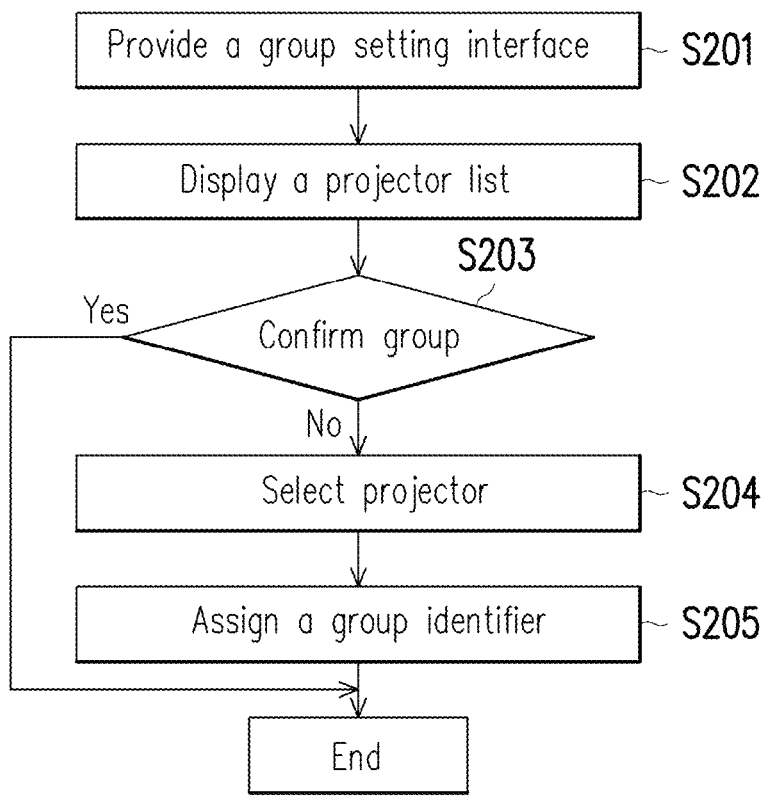
FIG. 3 is a flowchart of setting a group according to an embodiment of the disclosure.
Figure 4:
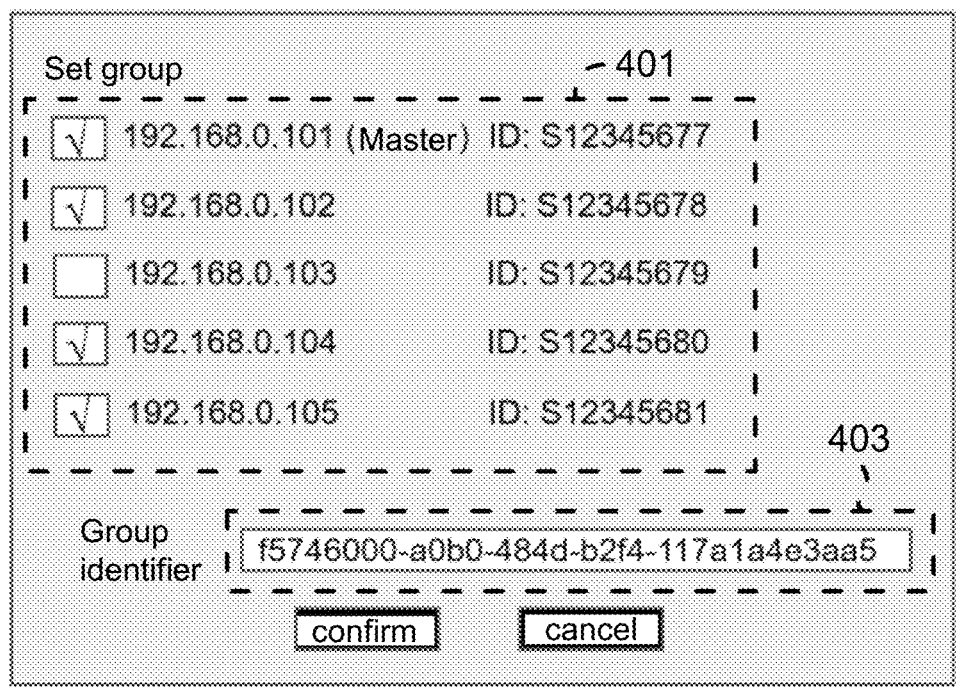
FIG. 4 is a schematic diagram of a group setting interface according to an embodiment of the disclosure.

FIG. 3 is a flowchart of setting a group according to an embodiment of the disclosure. Referring to FIG. 3, before performing the projection stacking procedure, the processor 53 may display an on-screen display (OSD) or a web page through a display (for example, an LCD or LED display), or the master projector 10 may project the OSD or the web page to provide a group setting interface (step S201). The interface is a user interface for a user to set up groups or other procedures. For example, FIG. 4 is a schematic diagram of a group setting interface according to an embodiment of the disclosure. Referring to FIG. 4, the user interface includes a projector list 401 and a group identifier 403

(detailed content thereof is described in subsequent embodiments). It should be noted that the content shown in FIG. 4 is only used as an example, and there may be other content or designs in other embodiments, which is not limited by the embodiment of the disclosure.

Taking the processor 53 of the computing device 50 as an example, the processor 53 may search for the projectors 10 in the local area network and display a projector list (step S202). For example, a projector list 401 of FIG. 4 includes related information (for example, network addresses, identifiers, etc.) of the projectors 10. The network addresses of the projectors 10 may belong to the same local area network. For example, the processor 53 may obtain local area network information (for example, device information, or network addresses, etc.) via the gateway device 70 based on the Ethernet protocol.

In an embodiment, the processor 53 may determine whether a group identifier already exists. The group identifier represents an identifier of those projectors 10 that have formed a group (for example, a universally unique identifier (UUID), a QR code, or other codes). For example, a group identifier 403 in FIG. 4 is a UUID. If the group identifier already exists (representing that the group has already set), the processor 53 may directly display the projector list corresponding to the group identifier. As shown in FIG. 4, a part of the projectors 10 in the projector list 401 have been selected (indicated by a tick "✓" in the figure). If there is no group identifier (representing that the group has not set), the processor 53 may display a projector list corresponding to multiple projectors 10 in the local area network. In other embodiments, regardless of whether there is a group identifier, all projectors 10 in the local area network or other local area networks may be displayed on the user interface.

The processor 53 may determine whether the group for which the group identifier already exists is correct (step S203). For example, the processor 53 determines whether the selected projector 10 is correct or the displayed group identifier is correct. If the user confirms that the group is correct, the group setting is completed. If the group is incorrect, the processor 53 may select at least two of the projectors in response to a user operation (step S204). For example, the user operation is a selection operation (for example, clicking, pressing, or sliding) for a specific projector 10 received through a mouse, a keyboard, a touch panel, other input devices, or a control interface of the projector. Taking FIG. 4 as an example, if the user selects the projector 10 with the network address of "192.168.0.103", the processor 53 may check these projectors 10 in the projector list 401. It should be noted that if the group identifier already exists, some projectors 10 may have been selected, and the processor 53 may deselect the selected projectors 10 in response to the user operation or other disconnection/abnormal situations.

If the current group is set to a newly created group (the group identifier does not yet exist) or an updated group (the group identifier already exists), the processor 53 may assign a group identifier to the selected multiple projectors 10 (step S205). The group identifier may be generated according to a random number or a specific rule. A group relationship between the group identifier and the selected projectors may be recorded in a memory of the computing device 50 or a memory of the projector 10, and is loaded after next booting for the user to confirm or modify.

In other embodiments, the processor 53 may automatically set all of or a part of the projectors that have been connected or in the local area network to the same group. In some embodiments, the step of setting group S101 may be ignored or disabled, depending on the needs of the user.

Referring to FIG. 2 again, the processor 53 or the processor 13 may reset the projection lens of each of the projectors 10 connected in the group to reset the number of motor steps of the projection lens to zero (step S102). For example, the processor 53 may send a shifting reset instruction or information to the projectors 10. For another example, the processor 53 may prompt the user with information related to a manual reset the projection lens position on the user interface. In this way, it avails the calculation and correction of subsequent image stacking. For example, the processor 53 or the processor 13 transmits a shifting reset instruction or information to a motor (such as a stepping motor), and through driving of the motor and mechanical components, a projection direction of the projection lens, such as horizontal and vertical shifting, may be adjusted.

Figure 5:
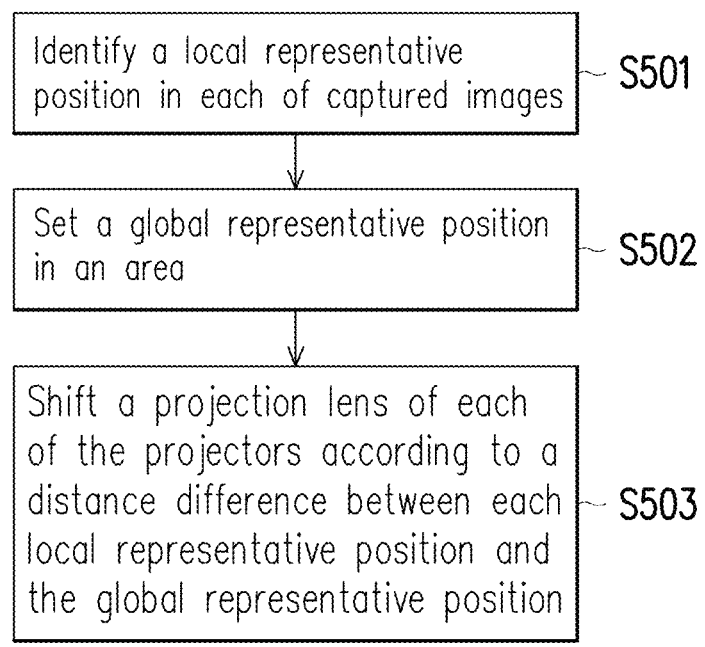
FIG. 5 is a flowchart of a projected image stacking method according to an embodiment of the disclosure.
Figure 6:
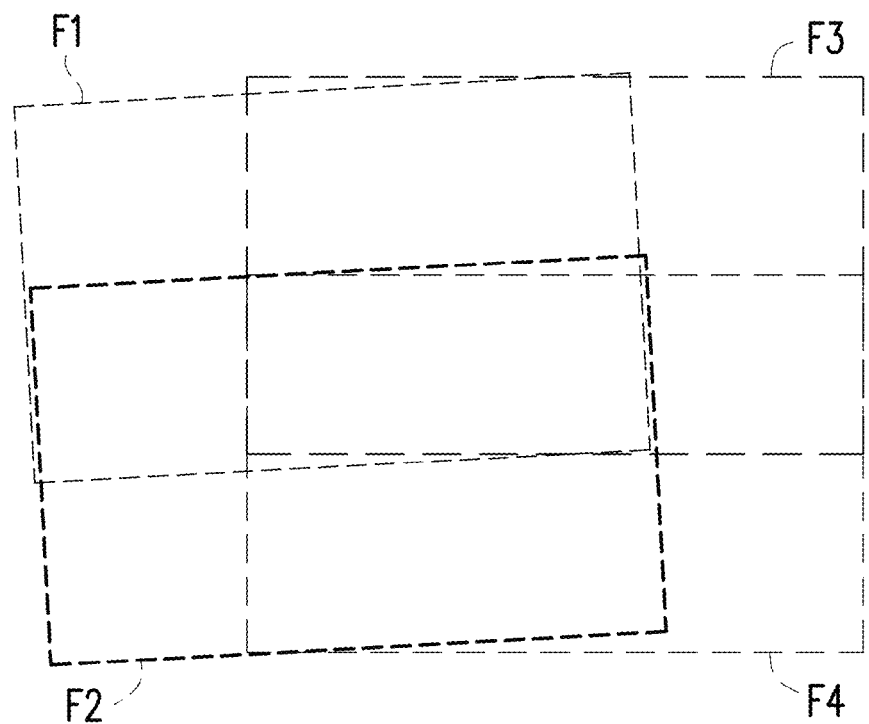
FIG. 6 is a schematic diagram of images projected by four projectors according to an embodiment of the disclosure.

The processor 53 may perform feedback correction on the projection lens for controlling shifting of the projection lens (step S103). To be specific, FIG. 5 is a flowchart of a projected image stacking method according to an embodiment of the disclosure. Referring to FIG. 5, one of the goals of image stacking is to maximize the overlap of the images projected by the projectors 10 to achieve a higher or maximum image, brightness, and/or chroma. FIG. 6 is a schematic diagram of images projected by four projectors 10 according to an embodiment of the disclosure. Referring to FIG. 6, projected images F1-F4 of the projectors 10 are still partially not overlapped, and the projection lenses need to be further shifted to achieve the maximum or greater overlap.

Multiple captured images captured by the image capturing device 30 are transmitted to the processor 53, and the processor 53 may identify each individual representative position of each projected image by each of the captured images (step S501). To be specific, as shown in FIG. 1B, the captured images are obtained by respectively capturing areas projected by the multiple projectors 10. Each individual representative position is related to image content projected by each projectors 10. In other words, each individual representative position corresponds to a representative position of a projected image of the projector 10, and the image content is used to indicate the representative position.

Figure 7:
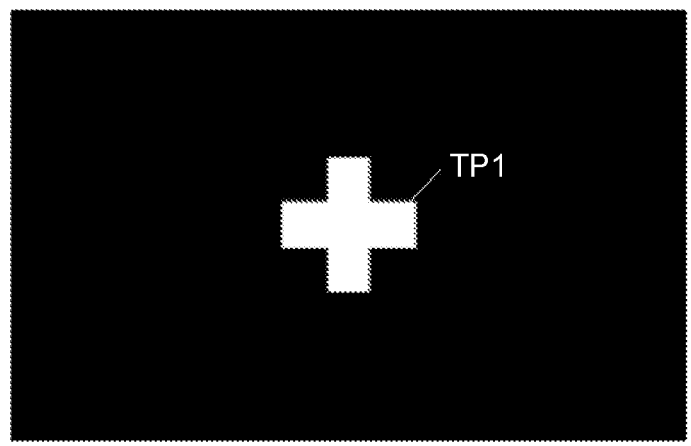
FIG. 7 is a schematic diagram of a test pattern according to an embodiment of the disclosure.

In an embodiment, the processor 53 may control a tester of the multiple projectors 10 (one of the projectors 10) to project a first image and the others of the multiple projectors 10 to project a second image. The first image includes a test pattern TP1, and the second image is a monochrome image (for example, a plain color, a specific shading, or other shutters). For example, FIG. 7 is a schematic diagram of the test pattern TP1 according to an embodiment of the disclosure. Referring to FIG. 7, the first image has a black background, and the test pattern TP1 is a white cross shape. The test pattern TP1 is located at a mass center (serving as the individual representative position) of the first image. Namely, the test pattern TP1 is approximately located at a mass center in the first image projected by the tester. The second image is a black image. At this time, the entire of the images projected by the multiple projectors 10 includes the black background and the test pattern TP1.

It should be noted that the position of the mass center in FIG. 7 is taken as the individual representative position, and the position of the mass center includes a geometric center. However, in other embodiments, a centroid, a center of gravity, a corner, an edge, or any designated position in the image may be used as the test pattern and the individual representative position. In other words, the test pattern TP1 may be located at any designated position in the first image.

In addition, the test pattern TP1 in the first image is not limited to the cross shape, which may also be a circle, a square, a bull's-eye, a cross sign, or other patterns.

In an embodiment, the processor 53 may sequentially control one of the projectors 10 to serve as the tester (i.e., the first image is projected first). A projection order may be random or according to specific rules (for example, an order of the network addresses, an order of the identifiers, etc.), which is not limited by the disclosure. At the same time, there is only one projector 10 serving as the tester. On the other hand, in the process that the projectors 10 project the first image and the second image, the processor 53 may capture the area projected by the multiple projectors 10 through the image capturing device 30 to obtain a first captured image in multiple captured images. For example, the first projector 10 serves as a tester and projects the test pattern TP1, and the other projectors 10 project the second image, and the image capturing device 30 captures the first captured image corresponding to the first projector 10 in a time sequence. Then, the second projector 10 serves as the tester and projects the test pattern TP1, and the image capturing device 30 captures the first captured image corresponding to the second projector 10, and the rest may be deduced by analogy. It should be noted that the test pattern projected by each projector 10 serving as the tester may be the same or different.

The processor 53 may determine the individual representative position of the tester according to the test pattern in the first captured image. For example, the processor 53 may recognize a centroid, a center of gravity, a corner, an edge, or other designated positions of the test pattern in the first captured image based on image recognition technology (for example, feature comparison, neural network inference, etc., which may be implemented through OpenCV function library or other image processing software), and use the same as the individual representative position of the tester.

In other embodiments, the processor 53 may also directly recognize a corner or other designated positions of the first image based on the image recognition technology without using a pattern. Taking FIG. 6 as an example, the projected images F1-F4 display their edges, and the processor 53 recognizes upper left corners of the projected images F1-F4 and takes the same as the individual representative positions of the projectors 10 accordingly.

Figure 8:
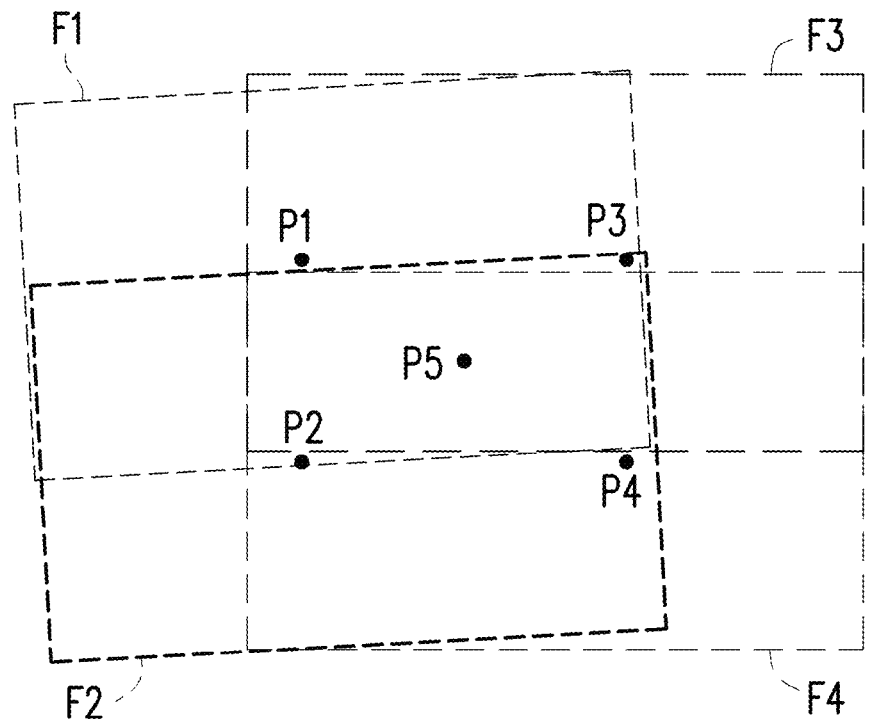
FIG. 8 is a schematic diagram of representative positions according to an embodiment of the disclosure.

FIG. 8 is a schematic diagram of representative positions according to an embodiment of the disclosure. Referring to FIG. 8, taking the position of the mass center as an example, the processor 53 may obtain the individual representative positions of the projected images F1-F4. In an embodiment, the processor 53 may form a coordinate system for the areas projected by the projectors 10, and further determine coordinate positions of the individual representative positions in the coordinate system. In an embodiment, the processor 53 may determine pixel positions of the individual representative positions in the captured images.

Referring to FIG. 5, the processor 53 may set a common representative position in the areas projected by the projectors 10 (step S502). To be specific, the common representative position is a target position to be approached or overlapped by the corresponding individual representative positions after the projection lenses of the multiple projectors 10 are shifted. In an embodiment, the processor 53 may determine the common representative position according to a common mass center of the individual representative position corresponding to each of the multiple projectors 10. For example, the processor 53 takes a mass center of a geometric shape formed by the multiple individual representative positions as the common representative position. Taking FIG. 8 as an example, a position of the mass center of the individual representative positions P1-P4 is a common representative position P5. In an embodiment, the processor 53 may calculate the position of the mass center according to a specific corner, a centroid, a center of gravity, or other positions of the geometric shape formed by the individual representative positions to serve as the common representative position.

The processor 53 may shift the projection lens of each of the multiple projectors 10 according to a distance difference between each individual representative position and the common representative position (step S503). In an embodiment, the distance difference includes a horizontal distance difference and a vertical distance difference. Namely, the distance differences between each individual representative position and the common representative position in the horizontal and vertical directions. In an embodiment, the distance difference includes a vector, i.e., the vector of each individual representative position and the common representative position vector (including shifting and direction). One of the goals of the processor 53 is to minimize or reduce the distance difference between each individual representative position and the common representative position. The processor 53 may control the number of motor steps for the shifting of the projection lens of each projector 10 to move the corresponding projected image and also move each of the individual representative positions.

Figure 9:
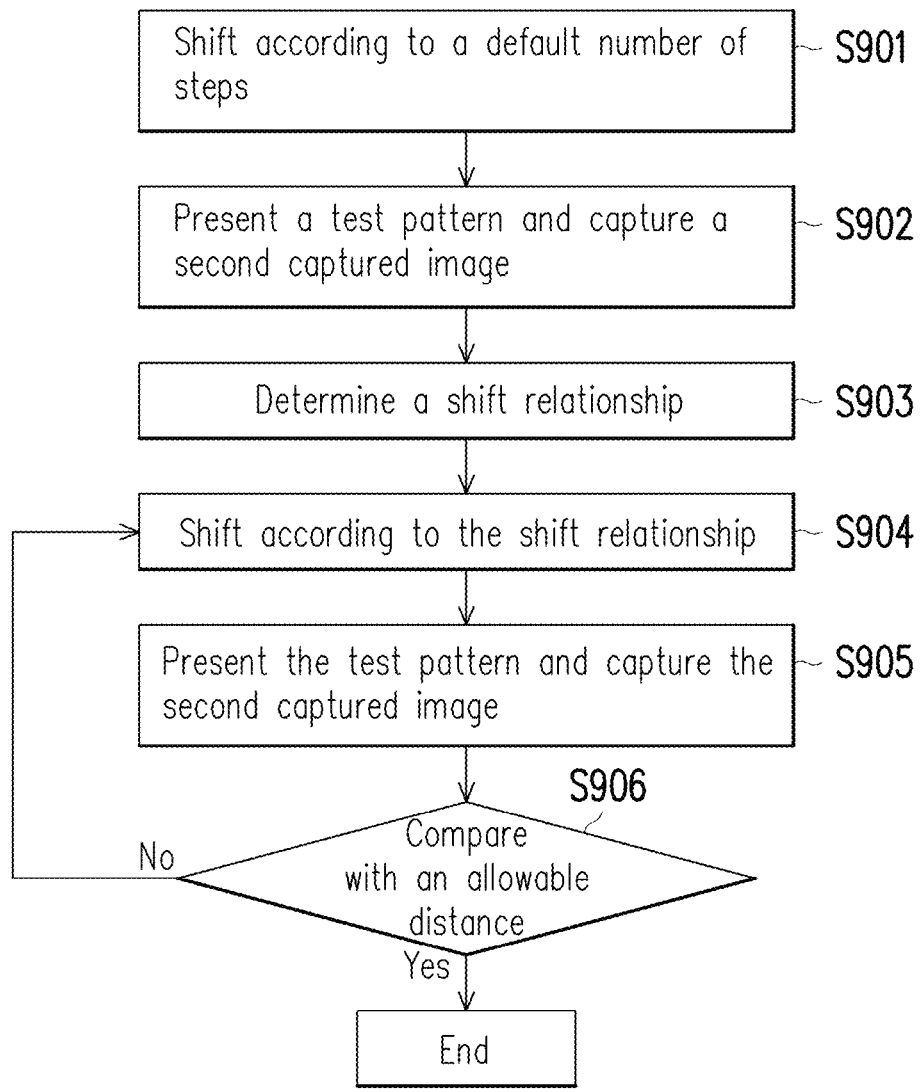
FIG. 9 is a flowchart of projection shifting according to an embodiment of the disclosure.

FIG. 9 is a flowchart of projection shifting according to an embodiment of the disclosure. Referring to FIG. 9, in order to speed up a moving speed of the individual representative position, the processor 53 may allow the projection lens of the projector 10 to be roughly adjusted (i.e., the number of motor steps is more) first and then gradually fine-tuned (i.e., the number of motor steps is less) to correct the position. The processor 53 may shift the projection lens of the corresponding projector 10 according to a default number of motor steps (step S901). The default number of motor steps may be any specified number of motor steps. On the other hand, the processor 53 may sequentially control the projector 10 serving as the tester to present/project a test pattern (which may be the same or different from the aforementioned determined representative position) and capture images of the areas projected by the projectors 10 through the image capturing device 30 to obtain a second captured image in multiple captured images (step S902). Regarding the adjustment of each projector 10 serving as the tester, during the process of adjusting the projection lens, the projected images of the other projectors 10 are not displayed (for example, turning off the light source or displaying a black image or another plain color image), which avails determining a difference of an update distance of the tester. For example, when adjusting the projection lens of the projector 10, the processor 53 compares the individual representative position represented by the projected image of the test pattern with the original common representative position whenever the motor takes a few steps. During the adjustment process of the projector 10, when the image capturing device 30 takes a picture, the other projectors 10 turn off light sources or project the second image, and the projected image of the tester is clearly captured by the image capturing device 30, which helps to calculate the distance difference between the updated individual representative position and the common representative position.

The processor 53 may determine a shifting relationship between the shifting distance of the individual representative position and the number of motor steps corresponding to the projection lens according to the distance difference (step S903). It is assumed that each step of the motor of the projection lens drives the individual representative position to move a substantially same distance in the same direction (for example, horizontal, vertical, or other directions) in the area. At this time, the shifting relationship is the relationship between the number of motor steps and a shifting distance of the individual representative position, for example, a shifting distance of the individual representative position in the captured image or the area when the number of motor steps is one step.

In an embodiment, the processor 53 may determine a shifting distance amount (i.e., a shifting distance) of the individual representative position in the area in response to the default number of motor steps. In other words, the shifting distance is a shifting distance amount of the individual representative position driven by the default number of motor steps. The processor 53 may determine the shifting relationship according to the default number of motor steps and the shifting distance amount. For example, the shifting relationship is a ratio of the number of motor steps to the shifting distance amount of the individual representative position.

Figure 10A:
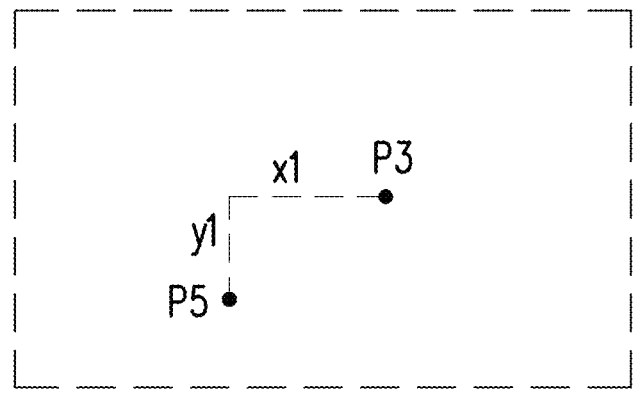
FIG. 10A is a schematic diagram of a position relationship of representative positions according to an embodiment of the disclosure.

For example, FIG. 10A is a schematic diagram of a position relationship of representative positions according to an embodiment of the disclosure. Referring to FIG. 10A, the processor 53 may calculate a distance difference between an individual representative position P3 and the common representative position P5 in the horizontal direction as x1, and the distance difference in the vertical direction as y1. The processor 53 may respectively move the projection lens of the projector 10 in the horizontal and vertical directions by the numbers of motor steps a1 and b1 (i.e., the default number of motor steps), and then project the test pattern through the projector 10 and obtain the second captured image through the image capturing device 30. The processor 53 recognizes the shifting distance amount of the individual representative position P3 in the horizontal and vertical directions in the second captured image, and the processor 53 uses the ratio of the shifting distance amount in the same direction to the default number of motor steps as the shifting relationship.

The processor 53 may shift the corresponding projection lens according to the shifting relationship to reduce the distance difference (step S904). For example, the processor 53 may determine the number of motor steps corresponding to the updated distance difference (i.e., the distance difference between the moved individual representative position and the common representative position) according to the ratio of the shifting distance amount to the default number of motor steps, and use such number of motor steps to move the projection lens. For example, the projection lens is respectively moved in the horizontal and vertical directions by the numbers of motor steps of a2 and b2.

Whenever the projection lens is moved, the processor 53 may control the projector 10 serving as the tester to present/project the test pattern again and capture the second captured image of the area projected by the projector 10 through the image capturing device 30 (step S905).

The processor 53 may further determine an updated distance difference between the shifted individual representative position and the common representative position, and stop shifting the corresponding projection lens according to a comparison result of the updated distance difference and an allowable distance. To be specific, the processor 53 compares the updated distance difference with the allowable distance (step S906). The allowable distance is related to a distance traveled by the individual representative position in response to each motor step. It should be noted that a motor tooth space may have a tolerance, so that the individual representative position after shifting may not be directly overlapped with the common representative position. In order to confirm that the distance difference is the closest distance that is unable to be adjusted by the motor. The allowable distance may be less than a distance traveled by the individual representative position driven by one motor step. For example, if one motor step may make the shifting distance amount of the individual representative position to be one centimeter, the allowable distance may be 0.5, 0.8, or 0.2 centimeters.

The comparison result includes that the updated distance difference is not greater than or greater than the allowable distance. If the comparison result is that the updated distance difference is not greater than the allowable distance ("Yes" shown in FIG. 9), the processor 53 may end shifting the projection lens of the tester (i.e., stop shifting the projection lens of the projector 10). If the comparison result is that the updated distance difference is greater than the allowable distance ("No" shown in FIG. 9), the processor 53 may continue to shift the projection lens of the tester.

Figure 10B:
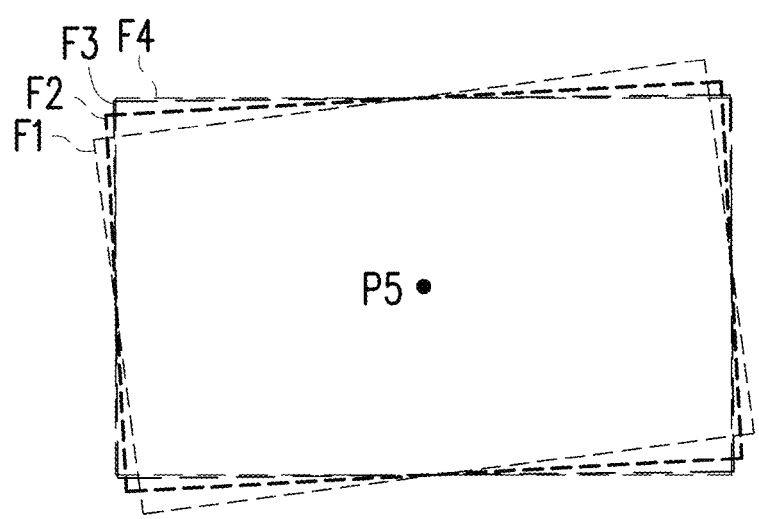
FIG. 10B is a schematic diagram of overlapping representative positions according to an embodiment of the disclosure.

FIG. 10B is a schematic diagram of overlapping representative positions according to an embodiment of the disclosure. Referring to FIG. 10B, after the projection lenses of all the projectors 10 are shifted, the individual representative positions of the four projected images F1-F4 may be overlapped with the common representative position P5.

It should be noted that in other embodiments, the processor 53 may first control the motor to move a random number of steps without using the default number of steps. In some embodiments, if the shifting relationship is fixed and known, the processor 53 may directly use the shifting relationship to shift the projection lens.

Figure 11:
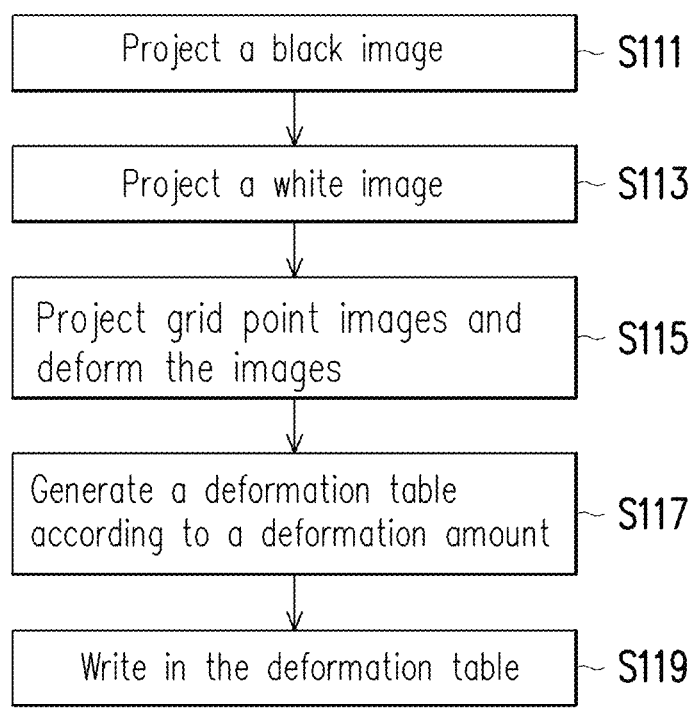
FIG. 11 is a flowchart of warping adjustment according to an embodiment of the disclosure.

Referring to FIG. 2, in an embodiment, the processor 53 may further correct distortion of image stacking (step S104). To be specific, FIG. 11 is a flowchart of warping adjustment according to an embodiment of the disclosure. Referring to FIG. 11, the processor 53 may sequentially control the projectors 10 to respectively project multiple monochrome images (for example, black, white, or other plain color images) (steps S111 and S113), and obtain image ranges of the multiple projectors 10 according to a third captured image among multiple captured images obtained by capturing the monochrome image to determine the maximum stacking area. The maximum stacking area is related to the image ranges of the monochrome images presented on the area A, i.e., the maximum stacking area is the farthest boundary of the monochrome images in the third captured image. If an edge of any monochrome image is closer to an edge of the third captured image in the third captured image, the edge of such monochrome frame may be used as the farthest boundary.

Figure 12:
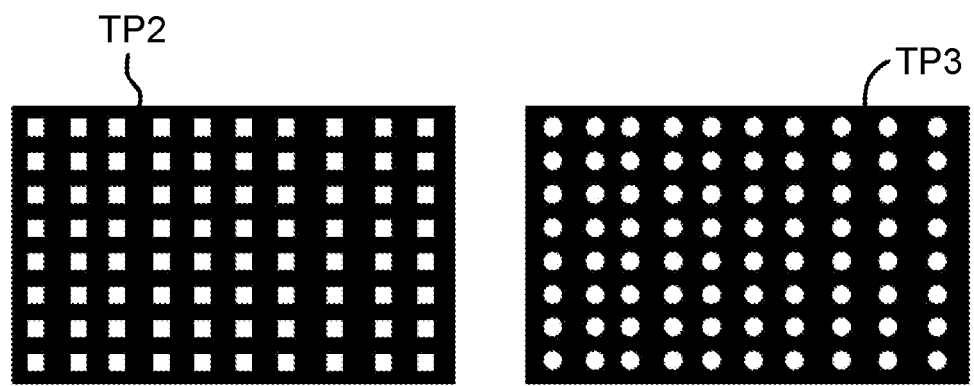
FIG. 12 is a schematic diagram of full grid point patterns according to an embodiment of the disclosure.

The processor 53 may control the projectors 10 to project multiple grid point images for obtaining coordinate positions of the projected images of these projectors 10, and warp the grid point images projected by the projectors 10 within the maximum stacking area (i.e., varied image) (step S115). FIG. 12 is a schematic diagram of full grid point patterns according to an embodiment of the disclosure. Referring to FIG. 12, test patterns TP2 and TP3 of the full grid points respectively include square and round grid points, but the embodiment of the disclosure is not limited thereto. After projecting the grid point images, the processor 53 may capture the test patterns through the image capturing device 30 to obtain a fourth captured image among the plurality of captured images. The processor 53 may adjust the shape and/or position of the pattern in the fourth captured image. For example, the processor 53 may align the sides and corners of each grid point image with the corresponding sides and corners of the maximum stacking area. The processor 53 may completely overlap the multiple grid point images projected by the multiple projectors 10 to obtain a warping amount of the grid point image projected by each of the projectors 10. For example, the complete overlap means that the positions and shapes of the test patterns TP2 projected by the projectors 10 are substantially the same. The warping amount is a zoom ratio or shifting distance. After the shifting of step S103, the image quality may be improved without excessive adjustment in step 104 and without sacrificing too much image resolution.

The processor 53 may generate a warping table according to the warping amounts of the grid point images in the maximum stacking area (i.e., a magnitude/degree of image change) (step S117). Namely, the warping table records the warping amount of each projector 10. In addition, the deformation table may be stored in a memory of the processor 53 or a memory of the projector 10 for subsequent direct loading and application. In addition, the processor 53 may further write each deformation amount in the deformation table into the corresponding projector 10 (step S119).

Referring to FIG. 2, in an embodiment, the processor 53 may further fine-tune the stacked image (step S105). To be specific, the projectors 10 in the projection system 1 may be a monochrome projector. For example, one projector 10 only projects a red image, another projector 10 only projects a blue image, and two projectors only project green images. After the shifting in step S103, the projected images of the projectors 10 may be combined into a full-color image.

It should be noted that all of or a part of the operations of the aforementioned processor 53 may be implemented by the processor 13 of any one or more of the multiple projectors 10, and data such as related images, representative positions, shifting instructions, etc., may be obtained through wired, wireless transmission or inter-circuit/internal signal transmission.

In summary, according to the projection system and the projected image stacking method of the embodiments of the disclosure, the individual representative positions of the projected images of the projectors are determined through image recognition, and the projection lenses are shifted based on the distance difference between the individual representative positions and the common representative position, so as to quickly adjust the projection lens of each projector to facilitate stacking application of multiple projectors. In the disclosure, the operation of multiple projectors may be as convenient as the operation of a single projector based on control of a remoter or keys of a projector control interface. Moreover, the embodiment of the disclosure combined with automatic splicing may make the use of multiple projectors as convenient as the use of a single projector, and also has the advantages of low cost and flexibility in arbitrary combination.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents. Moreover, any embodiment of or the claims of the disclosure is unnecessary to implement all advantages or features disclosed by the disclosure. Moreover, the abstract and the name of the disclosure are only used to assist patent searching. Moreover, "first", "second", etc. mentioned in the specification and the claims are merely used to name the elements and should not be regarded as limiting the upper or lower bound of the number of the components/devices.

What is claimed is:

1. One or more non-transitory, machine-readable storage media having instructions stored thereon, which instructions, when executed by one or more electronic processors of a gaming system cause the gaming system to perform operations comprising:

in response to a first input by a live dealer at a dealer terminal of a first table from first and second live gaming tables, selecting a player interface device associated with a live player that is providing physical chips to, or receiving the physical chips from, the live dealer, wherein the gaming system is for use with the first and second live gaming tables, each table offering a live dealer-administered base game, each table bearing a physical base game layout with a plurality of player positions to accommodate respective player interface devices associated with respective live players, the base game being played with physical playing cards dealt from a card-handling device onto the table, the gaming system including a remote system and a local table system, the remote system being remote from the first and second tables and storing an electronic fund account of the live player, the local table system being at each table and including the dealer terminal managed by the live dealer;

in response to a second input by the live dealer at the dealer terminal at the first table, displaying, on the dealer terminal, a value of the physical chips; and crediting or debiting, by the remote system, the electronic fund account by the value based on a communication received by the remote system from the local table system at the first table.

2. The projected image stacking method as claimed in claim 1, wherein the step of identifying the individual representative position of each of the captured images comprises:

controlling a tester of the plurality of projectors to project a first image and each of the others of the plurality of projectors to project a second image, wherein the first image comprises a test pattern, and the second image is a monochrome image;

capturing the area to obtain a first captured image among the plurality of captured images; and determining the individual representative position corresponding to the tester according to the test pattern in the first captured image.

3. The projected image stacking method as claimed in claim 2, wherein the test pattern is located at a mass center of the first image projected by the tester.

4. The projected image stacking method as claimed in claim 1, wherein the step of shifting the projection lens of at least one of the plurality of projectors according to the distance difference between the common representative position and the individual representative position corresponding to the at least one of the plurality of projectors comprises:

determining a shifting relationship between a shifting distance of the individual representative position and a number of motor steps corresponding to the projection lens according to the distance difference, wherein each motor step of the projection lens results in an equal shifting distance of the individual representative position in a same direction in the area; and shifting the corresponding projection lens according to the shifting relationship to reduce the distance difference.

5. The projected image stacking method as claimed in claim 4, wherein the step of shifting the projection lens of at least one of the plurality of projectors according to the distance difference between the common representative position and the individual representative position corresponding to the at least one of the plurality of projectors comprises:
   shifting the corresponding projection lens according to a default number of steps;
   determining a shifting distance amount of the individual representative position in the area in response to the default number of steps; and
   determining the shifting relationship according to the default number of steps and the shifting distance amount.

6. The projected image stacking method as claimed in claim 4, wherein the step of shifting the projection lens corresponding to the at least one of the plurality of projectors according to the shifting relationship comprises:
   determining an updated distance difference between the common representative position and the shifted individual representative position corresponding to the at least one of the plurality of projectors ; and
   stopping shifting the corresponding projection lens according to a comparison result of the updated distance difference and an allowable distance, wherein the allowable distance is related to a distance travelled by the individual representative position in response to each motor step, and the comparison result comprises that the updated distance difference is not greater than the allowable distance.

7. The projected image stacking method as claimed in claim 1, wherein before the step of identifying the individual representative position of each of the plurality of captured images, the projected image stacking method further comprises:
   searching for the plurality of projectors in an individual area network;
   selecting at least two of the plurality of projectors; and
   assigning a group identifier to the selected plurality of projectors.

8. The projected image stacking method as claimed in claim 1, wherein after the step of shifting the projection lens of at least one of the plurality of projectors according to the distance difference between the common representative position and the individual representative position corresponding to the at least one of the plurality of projectors, the projected image stacking method further comprises:
   sequentially controlling the plurality of projectors to respectively project a plurality of monochrome images, and determining a maximum stacking area according to a plurality of captured images obtained by capturing the plurality of monochrome images, wherein the maximum stacking area is related to an image range of the plurality of monochrome images presented on the area;
   controlling the plurality of projectors to project a plurality of grid point images, and deforming the plurality of grid point images projected by the plurality of projectors within the maximum stacking area; and
   overlapping the plurality of grid point images projected by the plurality of projectors to obtain a deformation amount of each of the plurality of grid point images.

9. The projected image stacking method as claimed in claim 1, wherein before the step of identifying the individual representative position of each of the plurality of captured images, the projected image stacking method further comprises:
   resetting the projection lens of each of the plurality of projectors to reset a number of steps of the projection lens.

10. A projection system, comprising a plurality of projectors, an image capturing device, and a processor, wherein
   the plurality of projectors are configured to project a plurality of images, the image capturing device is configured to capture a plurality of captured images of an area projected by the plurality of projectors; and
   the processor is configured to identify each of individual representative positions of each of the plurality of captured images, set a common representative position according to a calculated common mass center of a geometric shape formed by the individual representative positions respectively corresponding to the plurality of projectors in the area, and shift a projection lens of at least one of the plurality of projectors according to a distance difference between the common representative position and each of the individual representative position corresponding to the at least one of the plurality of projectors, wherein the plurality of captured images are obtained by the image capturing device by respectively capturing the area projected by the plurality of projectors, and each of the individual representative positions is related to image content projected by each of the plurality of projectors.

11. The projection system as claimed in claim 10, wherein the processor is further configured to:
   control a tester of the plurality of projectors to project a first image and each of the others of the plurality of projectors to project a second image, wherein the first image comprises a test pattern, and the second image is a monochrome image;
   capture the area through the image capturing device to obtain a first captured image among the plurality of captured images; and
   determine the individual representative position corresponding to the tester according to the test pattern in the first captured image.

12. The projection system as claimed in claim 11, wherein the test pattern is located at a mass center of the first image projected by the tester.

13. The projection system as claimed in claim 10, wherein the processor is further configured to:
   determine a shifting relationship between a shifting distance of the individual representative position and a number of motor steps corresponding to the projection lens according to the distance difference, wherein each motor step of the projection lens results in an equal shifting distance of the individual representative position in a same direction in the area; and
   shift the corresponding projection lens according to the shifting relationship to reduce the distance difference.

14. The projection system as claimed in claim 13, wherein the processor is further configured to:
   shift the corresponding projection lens according to a default number of steps;
   determine a shifting distance amount of the individual representative position in the area in response to the default number of steps; and
   determine the shifting relationship according to the default number of steps and the shifting distance amount.

15. The projection system as claimed in claim 13, wherein the processor is further configured to:
  determine an updated distance difference between the common representative position and the shifted individual representative position corresponding to the at least one of the plurality of projectors; and
  stop shifting the corresponding projection lens according to a comparison result of the updated distance difference and an allowable distance, wherein the allowable distance is related to a distance travelled by the individual representative position in response to each motor step, and the comparison result comprises that the updated distance difference is not greater than the allowable distance.

16. The projection system as claimed in claim 10 wherein the processor is further configured to:
  search for the plurality of projectors in an individual area network;
  select at least two of the plurality of projectors; and
  assign a group identifier to the selected plurality of projectors.

17. The projection system as claimed in claim 10, wherein the processor is further configured to:
  sequentially control the plurality of projectors to respectively project a plurality of monochrome images, and determine a maximum stacking area according to a plurality of captured images obtained by capturing the plurality of monochrome images, wherein the maximum stacking area is related to an image range of the plurality of monochrome images presented on the area;
  control the plurality of projectors to project a plurality of grid point images, and deform the plurality of grid point images projected by the plurality of projectors within the maximum stacking area; and
  overlap the plurality of grid point images projected by the plurality of projectors to obtain a deformation amount of each of the plurality of grid point images.

18. The projection system as claimed in claim 10, wherein the processor is further configured to:
  reset the projection lens of each of the plurality of projectors to reset a number of steps of the projection lens.

19. A projected image stacking method, comprising steps of:
  controlling one of a plurality of projectors at a time to serve as a tester, and controlling the tester of the plurality of projectors to project a first image and each of the others of the plurality of projectors to project a second image, wherein the first image comprises a test pattern, and the second image is a monochrome image;
  capturing an area projected by the plurality of projectors respectively to obtain a plurality of captured images, wherein a first captured image among the plurality of captured images is obtained by capturing the first image projected by the tester and the second image projected by each of the others of the plurality of projectors;
  determining an individual representative position in the first captured image, wherein the individual representative position is related to the test pattern of the first image content projected by the tester served by each of the plurality of projectors;
  setting a common representative position in the area; and
  shifting a projection lens of at least one of the plurality of projectors according to a distance difference between the common representative position and the individual representative position corresponding to the at least one of the plurality of projectors.

20. A projected image stacking method, comprising steps of:
  identifying an individual representative position of each of a plurality of captured images, wherein the plurality of captured images are obtained by respectively capturing an area projected by a plurality of projectors, and each of the individual representative positions is related to image content projected by each of the plurality of projectors;
  setting a common representative position in the area;
  determining a shifting relationship between a shifting distance of the individual representative position and a number of motor steps of a projection lens corresponding to at least one of the plurality of projectors according to a distance difference between the common representative position and the individual representative position corresponding to the at least one of the plurality of projectors, wherein each of the motor step of the projection lens results in an equal shifting distance of the individual representative positions in a same direction in the area; and
  shifting the corresponding projection lens according to the shifting relationship to reduce the distance difference.

21. A projected image stacking method, comprising steps of:
  identifying an individual representative position of each of a plurality of captured images, wherein the plurality of captured images are obtained by respectively capturing an area projected by a plurality of projectors, and each of the individual representative positions is related to image content projected by each of the plurality of projectors;
  setting a common representative position in the area;
  shifting a projection lens of at least one of the plurality of projectors according to a distance difference between the common representative position and the individual representative position corresponding to the at least one of the plurality of projectors;
  sequentially controlling the plurality of projectors to respectively project a plurality of monochrome images, and determining a maximum stacking area according to a plurality of captured images obtained by capturing the plurality of monochrome images, wherein the maximum stacking area is related to an image range of the plurality of monochrome images presented on the area;
  controlling the plurality of projectors to project a plurality of grid point images, and deforming the plurality of grid point images projected by the plurality of projectors within the maximum stacking area; and
  overlapping the plurality of grid point images projected by the plurality of projectors to obtain a deformation amount of each of the plurality of grid point images.

22. A projected image stacking method, comprising steps of:
  resetting a projection lens of each of plurality of projectors to reset a number of steps of the projection lens;
  identifying an individual representative position of each of a plurality of captured images, wherein the plurality of captured images are obtained by respectively capturing an area projected by the plurality of projectors, and each of the individual representative positions is related to image content projected by each of the plurality of projectors;
  setting a common representative position in the area; and
  shifting the projection lens of at least one of the plurality of projectors according to a distance difference between the common representative position and the individual representative position corresponding to the at least one of the plurality of projectors.

23. A projection system, comprising a plurality of projectors, an image capturing device, and a processor, wherein
the plurality of projectors are configured to project a plurality of images, the image capturing device is configured to capture a plurality of captured images of an area projected by the plurality of projectors, wherein the plurality of captured images are obtained by respectively capturing the area projected by the plurality of projectors; and
the processor is configured to control a tester of a plurality of projectors to project a first image and each of the others of the plurality of projectors to project a second image, capture an area projected by the plurality of projectors to obtain a first captured image among the plurality of captured images, determine an individual representative position in the first captured image, identify each of individual representative positions of each of the plurality of captured images, set a common representative position in the area, and shift a projection lens of at least one of the plurality of projectors according to a distance difference between the common representative position and the individual representative position corresponding to the at least one of the plurality of projectors, wherein the first image comprises a test pattern, and the second image is a monochrome image, wherein each of the individual representative positions is related to image content projected by each of the plurality of projectors.

* * * * *